United States Patent
Kim et al.

(10) Patent No.: US 9,727,471 B2
(45) Date of Patent: Aug. 8, 2017

(54) METHOD AND APPARATUS FOR STREAM BUFFER MANAGEMENT INSTRUCTIONS

(75) Inventors: Daehyun Kim, San Jose, CA (US); Changkyu Kim, San Jose, CA (US); Victor W. Lee, Santa Clara, CA (US); Jatin Chhugani, Santa Clara, CA (US); Nadathur Rajagopalan Satish, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 12/955,763

(22) Filed: Nov. 29, 2010

(65) Prior Publication Data

US 2012/0137074 A1    May 31, 2012

(51) Int. Cl.
G06F 12/00 (2006.01)
G06F 12/0862 (2016.01)
G06F 9/30 (2006.01)

(52) U.S. Cl.
CPC ........ G06F 12/0862 (2013.01); G06F 9/3004 (2013.01); G06F 2212/6022 (2013.01)

(58) Field of Classification Search
CPC ............ G06F 12/0811; G06F 12/0871; G06F 12/0888
USPC .................................. 711/122, 133, 138, 141
See application file for complete search history.

(56) References Cited

U.S. PATENT DOCUMENTS

| | | | | |
|---|---|---|---|---|
| 2003/0126413 | A1* | 7/2003 | El-Kik et al. | 712/225 |
| 2008/0109606 | A1* | 5/2008 | Lataille et al. | 711/133 |
| 2008/0263262 | A1* | 10/2008 | Sokolov et al. | 711/100 |
| 2008/0282033 | A1* | 11/2008 | Badi et al. | 711/117 |
| 2009/0150642 | A1* | 6/2009 | Heil et al. | 711/203 |

OTHER PUBLICATIONS

Leverich, Jacob, et al., "Comparing Memory Systems for Chip Multiprocessors", Jun. 9, 2007, 11 pages, Computer Systems Laboratory, Stanford University, San Diego, California.
Leverich, Jacob, et al., "Comparing Memory Systems for Chip Multiprocessors", Computer Systems Laboratory, Stanford University, San Diego, California, (Jun. 9, 2007), 11 pages.

* cited by examiner

*Primary Examiner* — Gurtej Bansal
(74) *Attorney, Agent, or Firm* — Vecchia Patent Agent, LLC (57) ABSTRACT

A method and system to perform stream buffer management instructions in a processor. The stream buffer management instructions facilitate the creation and usage of a dedicated memory space or stream buffer of the processor in one embodiment of the invention. The dedicated memory space is a contiguous memory space and has a sequential or linear addressing scheme in one embodiment of the invention. The processor has logic to execute a stream buffer management instruction to copy data from a source memory address to a destination memory address that is specified with a desired level of memory hierarchy.

16 Claims, 5 Drawing Sheets

510 Stream buffer copy instruction:   S_BUFF_CP SRC, DST[LVL]
520 Micro-operation 1:                unallocated_load SRC, tmp_register
530 Micro-operation 2:                allocated_store DST[LVL], tmp_register

500                                   FIG. 5

610 Stream buffer copy instr. example : S_BUFF_CP 0x100, 0x10[L2$]

600                                   FIG. 6

710 Stream buffer copy instr. example : S_BUFF_CP 0x800, 0x17[L2$]

METHOD AND APPARATUS FOR STREAM BUFFER MANAGEMENT INSTRUCTIONS

FIELD OF THE INVENTION

This invention relates to a memory instruction set, and more specifically but not exclusively, to stream buffer management instructions.

BACKGROUND DESCRIPTION

There are numerous applications such as image processing, Fast Fourier Transform (FFT), Partial Differential Equation (PDE) solvers, Lattice Boltzmann Method (LBM) fluid simulations, Reverse Time Migration (RTM) seismic imaging, and Quantum Chromo dynamics (QCD), where the performance is determined by fast access to multi-dimensional arrays. Long stride memory accesses are often required to access multi-dimensional arrays and the accesses can cause cache memory conflicts that degrade the performance of a cache memory. For example, incorrect hardware pre-fetches of the cache memory lines bring unnecessary data and memory bandwidth is wasted.

Figure 1:
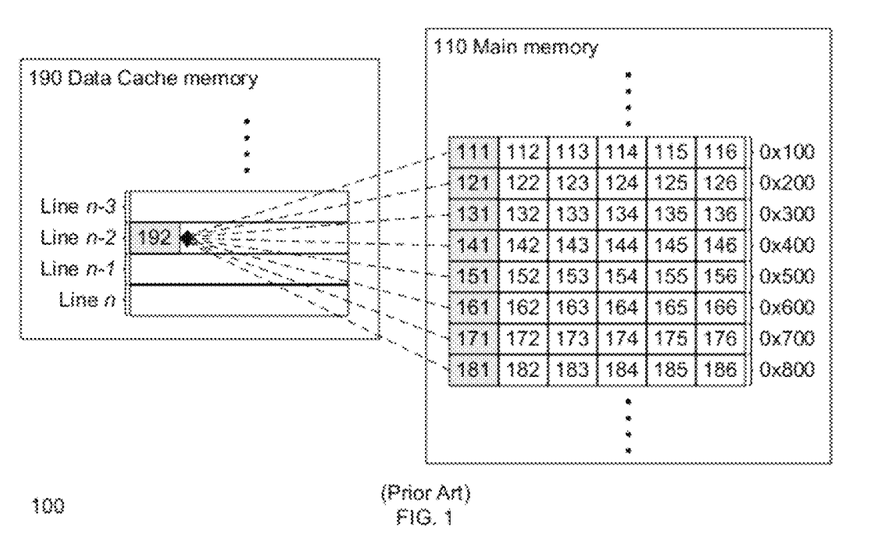
FIG. 1 illustrates a prior art main memory that stores a two dimensional array.

For example, FIG. 1 illustrates a prior art main memory 110 that stores a two dimensional array, i.e., six by eight array. To read the elements of the first column of the two dimensional array, i.e., elements 111, 121, 131, 141, 151, 161, 171 and 181, long stride memory accesses are required in order to obtain the data. The element 192 of the data cache memory 190 can cache any element of the first column of the two dimensional array. The cache memory conflict becomes more severe when there are multiple threads that share the same cache memory as they compete with each other for the usage of the cache memory.

BRIEF DESCRIPTION OF THE DRAWINGS

The features and advantages of embodiments of the invention will become apparent from the following detailed description of the subject matter in which.

DETAILED DESCRIPTION

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus to perform stream buffer management instructions in a processor. The stream buffer management instructions facilitate the creation and usage of a dedicated memory space or stream buffer of the processor in one embodiment of the invention. The dedicated memory space is a contiguous memory space and has a sequential or linear addressing scheme in one embodiment of the invention. The stream buffer management instructions create the stream buffer in, but is not limited, an internal main memory, an external main memory, a level one cache memory, a level two cache memory, a level three cache memory, and any other forms of memory or storage medium. The processor includes, but is not limited to, a single core processor, a multi-core processor, a graphics processing unit, a controller, a micro-controller and any other processing unit.

In one embodiment of the invention, the processor has logic to execute a stream buffer management instruction to copy data from a source memory address to a destination memory address. In one embodiment of the invention, the memory hierarchy of the destination memory address is selected based at least in part on a specified or desired memory hierarchy level in the instruction. The destination memory address specifies a storage location for the stream buffer and the stream buffer management instruction allows data to be read or written to the stream buffer. The stream buffer has a linear address space that allows it to avoid cache memory conflicts in one embodiment of the invention. A separate stream buffer may also be assigned to each thread of the processor in one embodiment of the invention. This prevents the potential cache memory conflicts among the threads in the processor.

Figure 2:
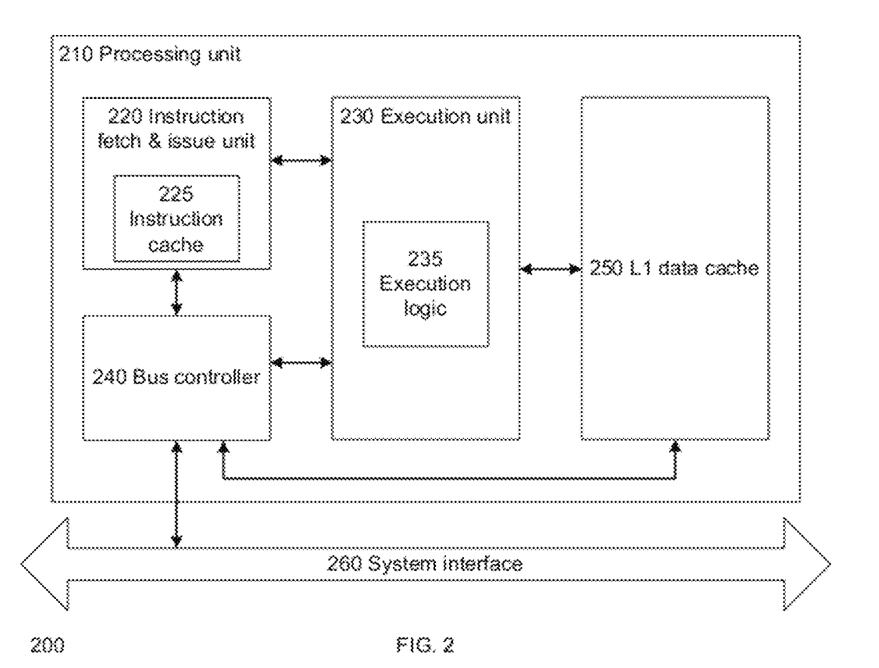
FIG. 2 illustrates a block diagram of a processing unit in accordance with one embodiment of the invention.

FIG. 2 illustrates a block diagram 200 of a processing unit 210 in accordance with one embodiment of the invention. The processing unit 210 has an instruction fetch and issue unit 220, a bus controller 240, an execution unit 230 and a level one (L1) data cache memory 250 in one embodiment of the invention.

The bus controller 240 of the processing unit 210 is coupled with a system interface 260 to connect to other components including, but not limited to, a main memory, a level two and/or higher levels of cache memory, a chipset and the like. The instruction fetch and issue unit 220 fetches instructions through the bus controller 240 via the system interface 260, or any other external interface. The fetched instructions are stored in the instruction cache memory 225.

The execution unit 230 receives and executes the fetched instructions from the instruction fetch and issue unit 220. The execution unit 230 has an execution logic 235 to perform arithmetic and logic operations, including but not limited to, add, subtract, logical AND, integer multiply, memory operations and the like. In one embodiment of the invention, the execution logic 235 executes stream buffer management instructions. The execution logic 235 facilitates the creation of a stream buffer or scratch pad in the one embodiment of the invention. The stream buffer can be created in, but not limited to, the L1 data cache memory 250, the level two (L2) data cache memory, the level three (L3) data cache memory, the main memory or any memory module.

In one embodiment of the invention, the execution logic 235 executes an instruction to copy data from a source memory address to a destination memory address, where the instruction is to specify a memory hierarchy level of the destination memory address. For example, in one embodiment of the invention, the instruction has three parameters that include, but are not limited to, a source memory address, a destination memory address, and a desired memory hierarchy level of the destination memory address.

In one embodiment of the invention, the source memory address is the physical or logical address of the data that needs to be copied into the stream buffer. In one embodiment of the invention, the data may reside in any of the cache memories, main memory, buffers, registers, mass storage devices and the like. In one embodiment of the invention, the destination memory address is the target physical or logical address to store or copy the data from the source memory address. The destination memory address includes the address of the stream buffer in one embodiment of the invention.

The desired memory hierarchy level of the destination memory address indicates the level of the memory hierarchy. The level of the memory hierarchy includes, but is not limited to, all the memory hierarchy levels of the available cache memories and/or main memory. For example, in one embodiment of the invention, to create a stream buffer in a L2 data cache memory, the desired memory hierarchy level of the destination memory address is specified as level two in the stream buffer management instruction. This allows the execution logic 235 to know that the data from the source memory address is desired to be copied to a stream buffer in the L2 data cache memory.

The illustration of the processing unit 210 is not meant to be limiting and different configurations of the processing unit 210 can be used without affecting the workings of the invention. In one embodiment of the invention, the L1 data cache memory 250 has other components such as a translation look-aside buffer (TLB) that is not shown in FIG. 2 for clarity of illustration. In one embodiment of the invention, the L1 data cache memory 250 is integrated with the execution unit 230.

Figure 3:
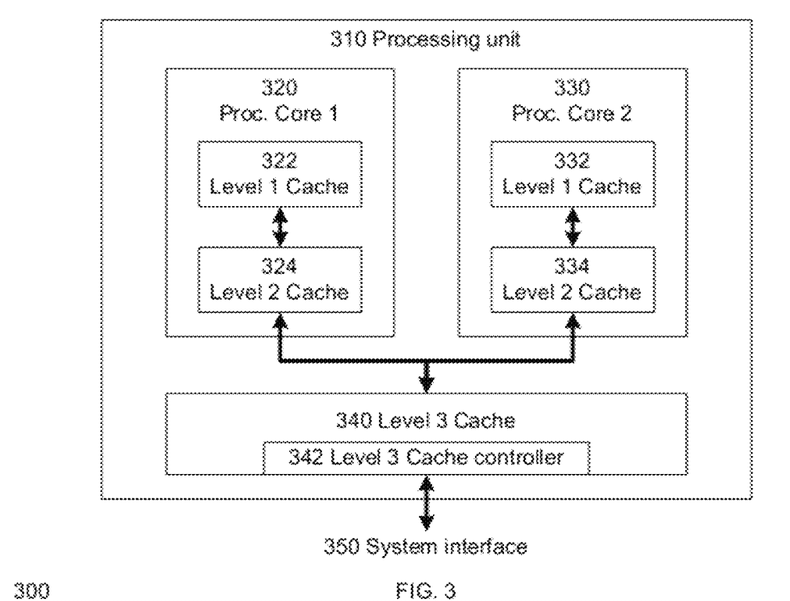
FIG. 3 illustrates a block diagram of a processing unit in accordance with one embodiment of the invention.

FIG. 3 illustrates a block diagram 300 of a processing unit 310 in accordance with one embodiment of the invention. In the processing unit 310, the cache memories have a different configuration compared to the cache memories in the processing unit 210. The L1 cache memory 322 and the L2 cache memory 324 are part of the processor core 1 320. Similarly, the L1 cache memory 332 and L2 cache memory 334 are part of the processor core 2 330. The L3 cache memory 340 is shared between the processor cores 320 and 330. The processing unit 310 is also connected with a system interface 350 to a main memory or external memory via the L3 cache memory controller 342. The processing unit 310 has logic to create the stream buffer in any of the cache memories and/or the main memory.

The L1, L2, and L3, cache memories shown in FIG. 3 are not meant to be limiting. One of ordinary skill in the relevant art will readily appreciate that other configurations of the cache memories in the processing unit 310 can also be used without affecting the workings of the invention. There can be more than 2 processor cores in one embodiment of the invention. In another embodiment of the invention, the processing unit 310 has a single processor core.

Figure 4:
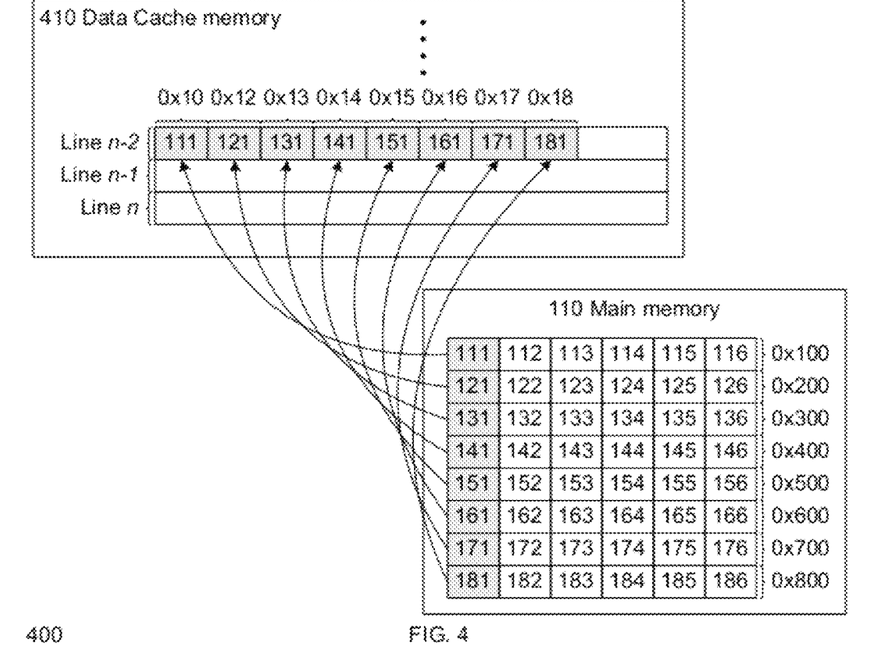
FIG. 4 illustrates a stream buffer in accordance with one embodiment of the invention.

FIG. 4 illustrates a stream buffer in accordance with one embodiment of the invention. In one embodiment of the invention, the data cache memory 190 has n number of cache memory lines, where n is any integer number. In one embodiment of the invention, a stream buffer with a linear or sequential address can be created in any of the cache memory lines of the data cache memory 190.

For example, in one embodiment of the invention, a stream buffer is created in cache memory line n-2 of the data cache memory 410. For clarity of illustration, the main memory 110 is assumed to store a two dimensional (2-D) array. The 2-D array has eight rows and six columns. Each element in the first column of the 2-D array, i.e., elements 111, 121, 131, 141, 151, 161, 171 and 181, is copied to the stream buffer in the cache memory line n-2 of the data cache memory 410 using one or more stream buffer management instructions.

For example, the element 111 has an address of 0x100 and it is copied to address 0x10 of the cache memory line n-2. The element 121 has an address of 0x200 and it is copied to address 0x12 of the cache memory line n-2. One of ordinary skill in the relevant will readily appreciate how the other elements 131, 141, 151, 161, 171 and 181 are copied to the stream buffer in the cache memory line n-2 and shall not be described herein.

The stream buffer management instructions reduce the programming complexity to create a stream buffer in the data cache memory 410. Unnecessary overheads such as cache pollution, and cache flush overheard can be avoided in one embodiment of the invention. The data cache memory 410 illustrates a cache memory of any hierarchy and the stream buffer management instructions allow the creation of a stream buffer in any desired level of cache memory.

For example, in one embodiment of the invention, the desired level of the memory hierarchy to create the stream buffer is selected based on the required data width. If the required data width is larger than the width of a cache memory line of a particular cache memory, the next higher level of cache memory of the particular cache memory that has a sufficient data width to store the data is used to create the stream buffer.

For example, if 64 kilobytes (KB) of data is required and the width of the L1 and L2 cache memory is 16 KB and 64 KB respectively, the L2 cache memory is selected to create the stream buffer as the L1 cache memory is too small. In one embodiment of the invention, a stream buffer may also be created in the main memory. The desired level of memory hierarchy to store the stream buffer is specified as a parameter in the stream buffer management instruction in one embodiment of the invention. This allows the flexibility to create a stream buffer in a suitable destination memory in one embodiment of the invention.

Figure 5:
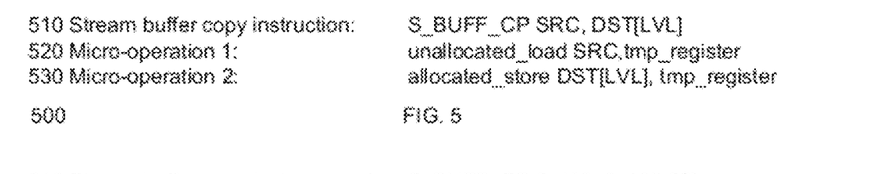
FIG. 5 illustrates a format of a stream buffer management instruction in accordance with one embodiment of the invention.

FIG. 5 illustrates a format 500 of a stream buffer management instruction in accordance with one embodiment of the invention. The stream buffer copy instruction 510 illustrates a stream buffer management instruction in one embodiment of the invention. The stream buffer copy instruction 510 provides the memory to memory copy semantics in one embodiment of the invention. The stream buffer copy instruction 510 has three parameters that include, but is not limited to, the source (SRC) memory address, the destination (DST) memory address, and the desired level (LVL) of the destination memory hierarchy.

The stream buffer copy instruction 510 reads data from the SRC memory address and write or copy the data to the DST memory address at the desired LVL in one embodiment of the invention. The LVL can be specified using operation codes (op-codes) such as L1$ to represent L1 cache memory, L2$ to represent L2 cache memory, Main Memory to represent the main memory and the like. One of ordinary skill in the relevant art will readily that other op-codes for the desired LVL can be used without affecting the workings of the inventions and these other op-codes shall not be described herein.

The size or width of the data to read from the SRC memory address can be set as, but not limited to, a byte, 32 bytes, 64 bytes, 128 bytes, a vector register width, and any other suitable data width. The illustration of the stream buffer copy instruction 510 is not meant to be limiting and a different configuration of the stream buffer copy instruction can be used without affecting the workings of the invention. For example, the order of the parameters can be set in a different order in one embodiment of the invention.

In one embodiment of the invention, the stream buffer copy instruction 510 allows a single memory copy operation to be performed, i.e., one SRC memory address and one DST memory address are specified. In another embodiment of the invention, the stream buffer copy instruction 510 allows more than one memory copy operation to be performed i.e., multiple SRC memory addresses and their respective DST memory addresses are specified. The stream buffer copy instruction 510 provides an efficient mechanism to copy between a multi-dimensional array and the linear stream buffer in one embodiment of the invention.

In one embodiment of the invention, the stream buffer copy instruction 510 reads the data from the SRC memory address without allocating any cache memory line. In one embodiment of the invention, the desired LVL of the DST memory address can be, specified by a user, generated by a compiler, detected by hardware logic, and the like. When the stream buffer copy instruction 510 reads the data from the SRC memory line, it searches the cache memory hierarchy to provide or maintain cache memory coherency. To avoid any cache memory pollution, the stream buffer copy instruction 510 does not allocate any cache memory line for the read data.

In one embodiment of the invention, the stream buffer copy instruction 510 is implemented with two micro-operations. The first micro-operation 520 is a load instruction that copies data from the SRC memory address to a temporary register (tmp_register) without allocating any cache memory line for the data. The second micro-operation 530 is a store instruction that writes the data in the temporary register to the destination memory address at the specified memory hierarchy.

The implementation of the stream buffer copy instruction 510 is not limited to the first micro-operation 520 and the second micro-operation 530. One of ordinary skill in the relevant art will readily appreciate how to use other micro-operations to implement the stream buffer copy instruction 510 and these other micro-operations shall not be described herein.

Figure 6:
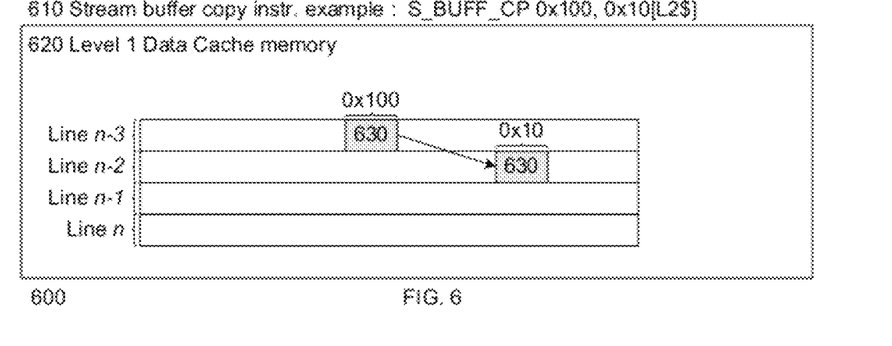
FIG. 6 illustrates an operation of a stream buffer copy instruction in accordance with one embodiment of the invention.

FIG. 6 illustrates an operation 600 of a stream buffer copy instruction 610 in accordance with one embodiment of the invention. For clarity of illustration, the stream buffer copy instruction 610 has a SRC memory address of 0x100 and a DST memory address of 0x10. The specified level of DST memory hierarchy is set as the op-code L2$ that represents a L2 cache memory.

When the stream buffer copy instruction 610 is executed, the execution logic first checks if the SRC memory address of 0x100 is cached in the L1 data cache memory 620 or the level of cache memory that is closest to the processing core. This is to ensure cache coherency. For clarity of illustration, the data 630 at the SRC memory address of 0x100 is assumed to be cached in the cache memory line n-3 of the L1 data cache memory 620.

As the data 630 at the SRC memory address of 0x100 is cached in the L1 data cache memory 620, the execution logic reads the data 630 from the SRC memory address of 0x100 in one embodiment of the invention. In one embodiment of the invention, the data 630 is accessed using a load instruction. In one embodiment of the invention, no cache memory line allocation is performed when the data 630 is read from the SRC memory address of 0x100. The execution logic writes the data 630 to the DST memory address 0x10 in the cache line n-2 of the L1 data cache memory 620. Even though the desired or specified level of the DST memory hierarchy is set at level two, the execution logic does not write the data 630 to the L2 cache memory as the cached data of the SRC memory address of 0x100 is lower than the desired level of the DST memory hierarchy.

Figure 7:
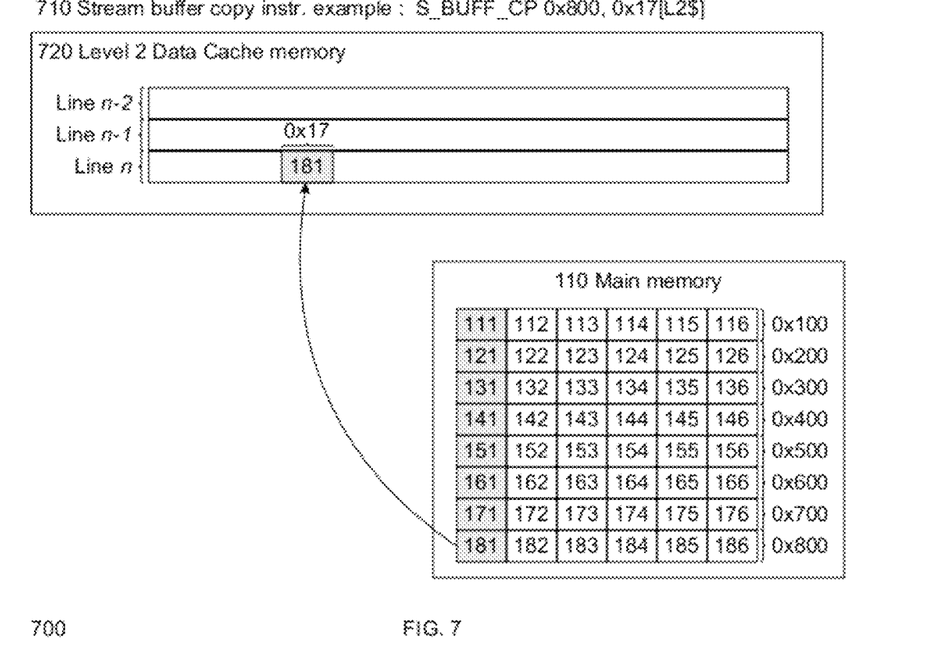
FIG. 7 illustrates an operation of a stream buffer copy instruction in accordance with one embodiment of the invention.

FIG. 7 illustrates an operation 700 of a stream buffer copy instruction 710 in accordance with one embodiment of the invention. For clarity of illustration, the stream buffer copy instruction 710 has a SRC memory address of 0x800 and a DST memory address of 0x17. The specified level of DST memory hierarchy is set as the op-code L2$ that represents a L2 cache memory.

When the stream buffer copy instruction 710 is executed, the execution logic checks if the data at the SRC memory address of 0x800 is cached in any of the cache memories to ensure cache coherency. For clarity of illustration, the SRC memory address of 0x800 is assumed not to be cached in any of the data cache memories. When the execution logic has determined that the SRC memory address of 0x800 is not cached in any of the cache memories, the execution logic reads the data 181 from the SRC memory address of 0x800 in the main memory 110.

In one embodiment of the invention, the data 630 is accessed using a load instruction. In one embodiment of the invention, no cache memory line allocation is performed when the data 181 is read from the SRC memory address of 0x800. The execution logic writes the data 181 to the DST memory address 0x17 in the cache line n of the L2 data cache memory 720. The execution logic writes the data 181 to the L2 cache memory as the main memory has a higher memory hierarchy than the desired level of the DST memory hierarchy.

The operations 600 and 700 are not meant to be limiting. One of ordinary skill in the relevant art will readily appreciate the workings of the other permutations of the stream buffer copy instruction and shall not be described herein.

Figure 8:
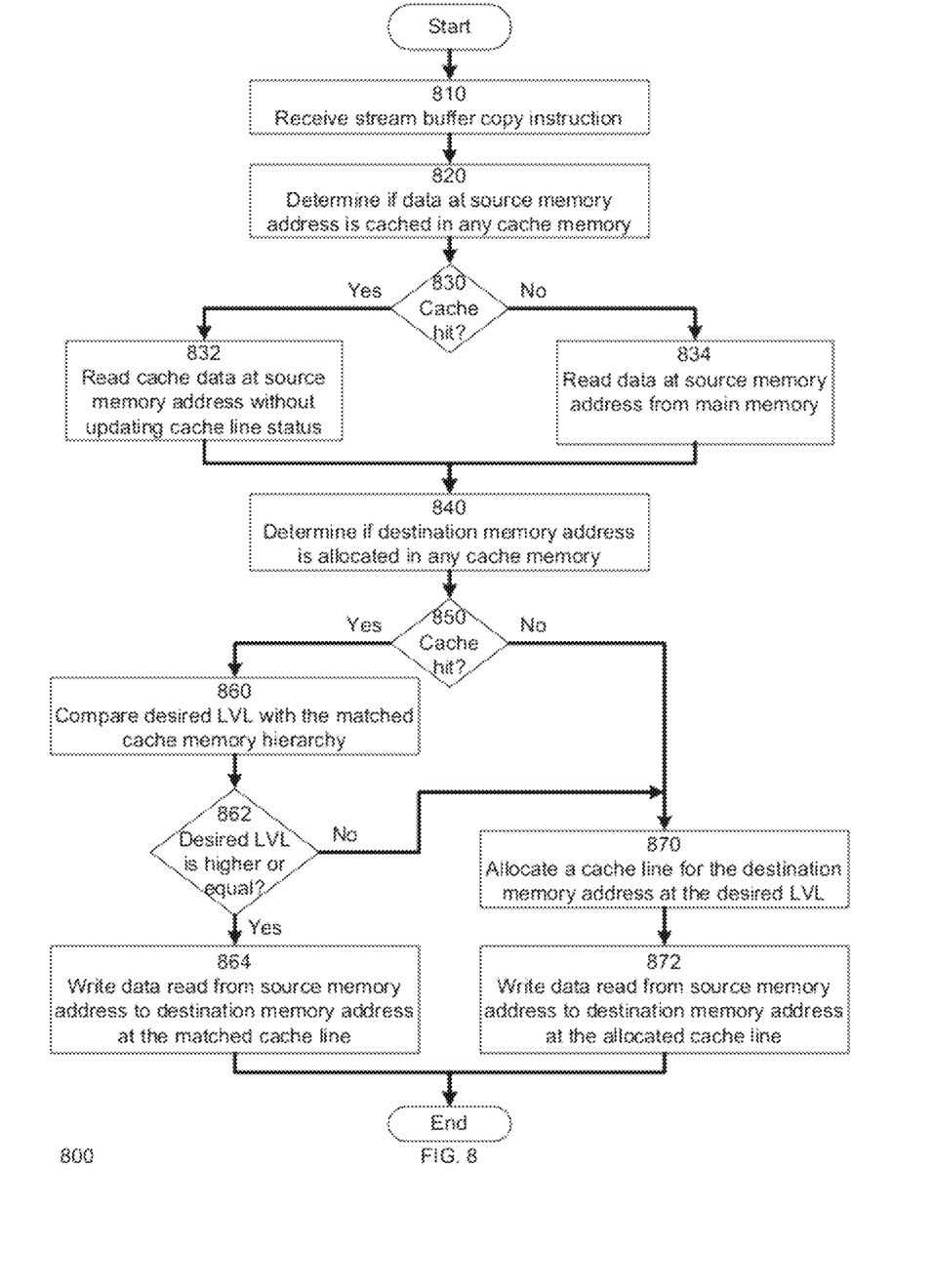
FIG. 8 illustrates a flow chart of an stream buffer management instruction in accordance with one embodiment of the invention.

FIG. 8 illustrates a flow chart 800 of a stream buffer management instruction in accordance with one embodiment of the invention. In step 810, a stream buffer copy instruction is received. In step 820, the execution logic executes the stream buffer copy instruction and determines if the data at the source memory address is cached in any of the cache memory lines in one embodiment of the invention. This is performed to ensure cache coherency and each increasing level of cache memory is searched in sequence to determine if the data at the source memory address is cached.

For example, in one embodiment of the invention, in step 820, the execution logic checks the tag directory or tag cache memory of the L1 cache memory to determine if the data at the source memory address is cached. If there is no match, i.e., a cache miss, the execution logic checks the tag cache memory of the next higher level of cache memory, i.e. L2 cache memory, to determine if the data at the source memory address is cached. This process is repeated for each higher level of cache memory.

In step 830, the flow 800 checks if there is a cache hit, i.e., the data at the source memory address is cached in a particular cache line of a particular cache memory. If there is a cache hit in step 830, the flow 800 goes to step 832 to read the cache data at the source memory address without updating the status of the cache memory line. No cache memory line allocation is performed in step 832 in one embodiment of the invention.

If there is no cache hit in step 830, this means that the data at the source memory address is in the main memory and the flow 800 goes to step 834. In step 834, the flow 800 reads the data at the source memory address from the main memory. In step 840, the flow 800 determines if the destination memory address of the buffer copy instruction is allocated in any of the cache memory lines. In step 850, the flow 800 checks if there is a cache hit.

If there is a cache hit in step 850, the flow 800 goes to step 860 to compare the desired level of memory hierarchy of the destination memory address with the matched cache memory hierarchy. In step 862, the flow 800 checks if the desired level of memory hierarchy of the destination memory address is higher or equal to the matched cache memory hierarchy. If yes, the flow 800 goes to step 864 and writes the data read from the source memory address to the destination memory address at the matched cache memory line and the flow 800 ends.

If there is no cache hit in step 850, the flow 800 goes to step 872 to allocate a cache memory line for the destination memory address at the desired level of memory hierarchy of the destination memory address. In step 874, the flow 800 writes the data read from the source memory address to the destination memory address at the allocated cache memory line and the flow 800 ends.

Figure 9:
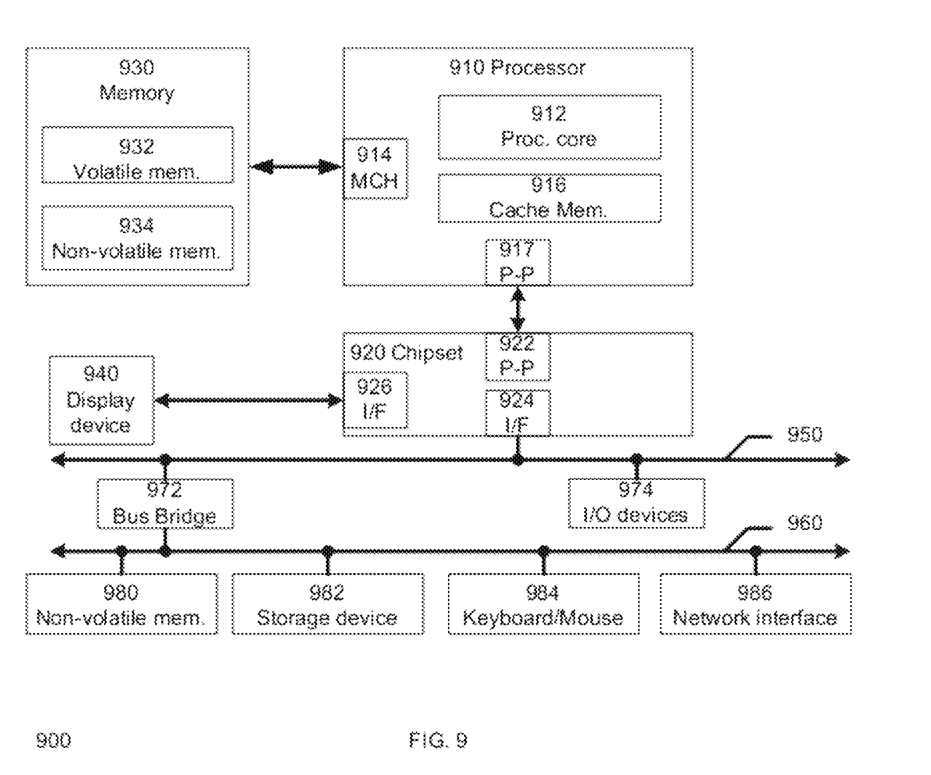
FIG. 9 illustrates a system in accordance with one embodiment of the invention.

FIG. 9 illustrates a system in accordance with one embodiment of the invention. The system 900 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 900 used to implement the methods disclosed herein may be a system on a chip (SOC) system.

The processor 910 has a processing core 912 to execute instructions of the system 900. The processing core 912 includes, but is not limited to, pre-fetch logic to fetch instructions, decode logic to decode the instructions, execution logic to execute instructions and the like. The processor 910 has a cache memory 916 to cache instructions and/or data of the system 900. In another embodiment of the invention, the cache memory 916 includes, but is not limited to, level one, level two and level three, cache memory or any other configuration of the cache memory within the processor 910. In one embodiment of the invention, the processor 910 is able to create a stream buffer in the cache memory 916 and/or the memory 930.

The memory control hub (MCH) 914 performs functions that enable the processor 910 to access and communicate with a memory 930 that includes a volatile memory 932 and/or a non-volatile memory 934. The volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 934 includes, but is not limited to, NAND flash memory, NOR flash memory, phase change memory (PCM), read only memory (ROM), electrically erasable programmable read only memory (EEPROM), or any other type of non-volatile memory device.

The memory 930 stores information and instructions to be executed by the processor 910. The memory 930 may also stores temporary variables or other intermediate information while the processor 910 is executing instructions. The chipset 920 connects with the processor 910 via Point-to-Point (PtP) interfaces 917 and 922. The chipset 920 enables the processor 910 to connect to other modules in the system 900. In one embodiment of the invention, the interfaces 917 and 922 operate in accordance with a PtP communication protocol such as the Intel® QuickPath Interconnect (QPI) or the like. The chipset 920 connects to a display device 940 that includes, but is not limited to, liquid crystal display (LCD), cathode ray tube (CRT) display, or any other form of visual display device.

In addition, the chipset 920 connects to one or more buses 950 and 960 that interconnect the various modules 974, 980, 982, 984, and 986. Buses 950 and 960 may be interconnected together via a bus bridge 972 if there is a mismatch in bus speed or communication protocol. The chipset 920 couples with, but is not limited to, a non-volatile memory 980, a mass storage device(s) 982, a keyboard/mouse 984 and a network interface 986. The mass storage device 982 includes, but is not limited to, a solid state drive, a hard disk drive, an universal serial bus flash memory drive, or any other form of computer data storage medium. The network interface 986 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 9 are depicted as separate blocks within the system 900, the functions performed by some of these blocks may be integrated within a single semiconductor circuit or may be implemented using two or more separate integrated circuits. For example, although the cache memory 916 is depicted as a separate block within the processor 910, the cache memory 916 can be incorporated into the processor core 912 respectively. The system 900 may include more than one processor/processing core in another embodiment of the invention.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A processor comprising:
   an instruction fetch unit to fetch an instruction of an instruction set of the processor, the instruction having a format that includes a first parameter to indicate a source memory address, a second parameter to indicate a different destination memory address which is different than the source memory address, and a third parameter to specify a memory hierarchy level for the destination memory address; and
   an execution unit to perform the instruction, wherein the execution unit to perform the instruction is to:
   perform a first operation to read data from the source memory address into a buffer of the processor without allocating a cache memory line to store the data; and
   perform a second operation to allocate a cache memory line at the destination memory address, and to store the data from the buffer of the processor to the allocated cache memory line, wherein the cache memory line is to be allocated in a cache memory that is to be based at least in part on the memory hierarchy level that is to be specified by the third parameter of the instruction.

2. The processor of claim 1, wherein the execution unit to perform the instruction to read the data from the source memory address is to:
   determine whether the data of the source memory address is stored in one of one or more cache memories; and
   in response to a determination that the data of the source memory address is stored in said one of the one or more cache memories, copy the data of the source memory address from said one cache memory to the buffer.

3. The processor of claim 1, wherein the buffer comprises a register.

4. The processor of claim 1, wherein a width of the data comprises one of a byte width, 32 bytes width, 64 bytes width, 128 bytes width, and a vector register width.

5. The processor of claim 1, wherein the instruction is to indicate a plurality of source memory addresses.

6. The processor of claim 1, wherein the data is to be read from a main memory into the buffer.

7. The processor of claim 1, wherein the buffer is in a core of the processor.

8. The processor of claim 1, wherein the cache memory is to be at the specified memory hierarchy level.

9. The processor of claim 1, wherein the cache memory is to be at a lower level than the specified memory hierarchy level.

10. A processor comprising:
    at least one cache memory; and
    a processor core to fetch an instruction of an instruction set of the processor, the instruction having a format that includes a first parameter to indicate a source memory address, a second parameter to indicate a different destination memory address which is different than the source memory address, and a third parameter to specify a memory hierarchy level for the destination memory address, the processor core to perform the instruction to:
    perform a first operation to read data from the source memory address into a buffer of the processor without allocating a cache memory line to store the data; and
    perform a second operation to allocate a cache memory line at the destination memory address, and to store the data from the buffer of the processor to the allocated cache memory line, wherein the cache memory line is to be allocated in a first cache memory that is to be based at least in part on the memory hierarchy level that is to be specified by the third parameter of the instruction.

11. The processor of claim 10, wherein the buffer is in a core of the processor.

12. The processor of claim 10, wherein the buffer comprises a register.

13. The processor of claim 10, wherein the data is to be read from a main memory into the buffer.

14. The processor of claim 10, wherein the instruction is to indicate a plurality of source memory addresses.

15. The processor of claim 10, wherein the first cache memory is to be at the memory hierarchy level.

16. The processor of claim 10, wherein the first cache memory is to be at a lower level than the memory hierarchy level.

* * * * *